(12) United States Patent
Park et al.

(10) Patent No.: US 11,324,371 B2
(45) Date of Patent: May 10, 2022

(54) ROBOT AND METHOD FOR CONTROLLING SAME

(71) Applicant: LG ELECTRONICS INC., Seoul (KR)

(72) Inventors: Hyunwoong Park, Seoul (KR); Minuk Kim, Seoul (KR); Gwanryong Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 16/477,363

(22) PCT Filed: Jan. 8, 2018

(86) PCT No.: PCT/KR2018/000361
§ 371 (c)(1),
(2) Date: Jul. 11, 2019

(87) PCT Pub. No.: WO2018/131856
PCT Pub. Date: Jul. 19, 2018

(65) Prior Publication Data
US 2019/0380550 A1 Dec. 19, 2019

(30) Foreign Application Priority Data
Jan. 13, 2017 (KR) .................. 10-2017-0006025

(51) Int. Cl.
*A47L 9/28* (2006.01)
*G05D 1/02* (2020.01)
*G05D 1/00* (2006.01)

(52) U.S. Cl.
CPC .......... *A47L 9/2815* (2013.01); *G05D 1/0088* (2013.01); *G05D 1/0238* (2013.01);
(Continued)

(58) Field of Classification Search
CPC ............. A47L 9/2815; A47L 2201/022; A47L 2201/04; A47L 2201/06; A47L 9/28;
(Continued)

(56) References Cited

U.S. PATENT DOCUMENTS

2005/0166357 A1 8/2005 Uehigashi
2005/0267631 A1* 12/2005 Lee ..................... G05D 1/0274
700/245
(Continued)

FOREIGN PATENT DOCUMENTS

JP 2005-211499 8/2005
KR 10-2009-0018562 2/2009
(Continued)

OTHER PUBLICATIONS

International Search Report (with English Translation) and Written Opinion dated Apr. 16, 2018 issued in Application No. PCT/KR2018/000361.
(Continued)

*Primary Examiner* — B M M Hannan
(74) *Attorney, Agent, or Firm* — Ked & Associates LLP

(57) ABSTRACT

To successfully deal with a problem to be solved by the present invention, a cleaner for performing automatic driving according to an embodiment of the present invention comprises: a body; a driving unit for moving the body; a detecting unit for acquiring information relating to an environment around the body while the body runs in a cleaning area; and a control unit which generates map information corresponding to the cleaning area on the basis of the information acquired by the detecting unit, configures a driving cost value for each of multiple grids included in the map information, and configures a driving route of the body on the basis of the configured driving cost value.

15 Claims, 6 Drawing Sheets

(52) U.S. Cl.
CPC ...... *G05D 1/0251* (2013.01); *A47L 2201/022* (2013.01); *A47L 2201/04* (2013.01); *A47L 2201/06* (2013.01); *G05D 2201/0215* (2013.01)

(58) Field of Classification Search
CPC ... A47L 9/2805; A47L 9/2852; G05D 1/0088; G05D 1/0238; G05D 1/0251; G05D 2201/0215; G05D 1/02; G05D 1/0274; G06T 7/11; G06T 7/30; G06T 7/90
USPC .................. 382/156; 700/255–259
See application file for complete search history.

(56) References Cited

U.S. PATENT DOCUMENTS

| | | | |
|---|---|---|---|
| 2006/0061657 | A1* | 3/2006 | Rew .................. G05D 1/0246 348/151 |
| 2010/0114466 | A1* | 5/2010 | Tomita .............. G01C 21/3461 701/118 |
| 2013/0000675 | A1 | 1/2013 | Hong et al. |
| 2014/0100736 | A1* | 4/2014 | Kim .................. B25J 9/0003 701/26 |
| 2016/0089783 | A1 | 3/2016 | Noh et al. |
| 2016/0147230 | A1* | 5/2016 | Munich ............... G01C 21/206 701/28 |
| 2017/0097643 | A1* | 4/2017 | Munich ................ B25J 5/007 |
| 2017/0273528 | A1* | 9/2017 | Watanabe ............... A47L 9/28 |
| 2018/0020893 | A1 | 1/2018 | Lee et al. |
| 2018/0206686 | A1* | 7/2018 | Shigeto ............... A47L 9/0411 |
| 2019/0053683 | A1* | 2/2019 | Watanabe ............... A47L 9/30 |

FOREIGN PATENT DOCUMENTS

| | | | |
|---|---|---|---|
| KR | 10-2012-0006407 | 1/2012 | |
| KR | 10-2013-0002218 | 1/2013 | |
| KR | 10-2014-0063119 | 5/2014 | |
| KR | 10-2014-0145648 | 12/2014 | |
| KR | 10-2015-0137643 | 12/2015 | |
| KR | 10-2016-0038437 | 4/2016 | |
| KR | 10-2016-0100149 | 8/2016 | |
| WO | WO 2007/051972 | 5/2007 | |
| WO | WO-2021050745 A1 * | 3/2021 | ......... G01C 21/3453 |

OTHER PUBLICATIONS

Korean Office Action dated Feb. 12, 2018 issued in KR Application No. 10-2017-0006025.
Korean Notice of Allowance dated Aug. 31, 2018 issued in KR Application No. 10-2017-0006025.
European Search Report dated Sep. 28, 2020 issued in EP Application No. 18738571.1.

* cited by examiner

ROBOT AND METHOD FOR CONTROLLING SAME

CROSS-REFERENCE TO RELATED PATENT APPLICATIONS

This application is a U.S. National Stage Application under 35 U.S.C. § 371 of PCT Application No. PCT/KR2018/000361, filed Jan. 8, 2018, which claims priority to Korean Patent Application No. 10-2017-0006025, filed Jan. 13, 2017, whose entire disclosures are hereby incorporated by reference.

TECHNICAL FIELD

The present disclosure relates to a cleaner and a method for controlling the same, and more particularly, to a cleaner capable of recognizing an obstacle and performing autonomous traveling, and a method for controlling the same.

BACKGROUND ART

In general, robots have been developed for industrial use and have been partially in charge of factory automation. In recent years, the field of applications of robots has been expanded, and home robots that can be used in ordinary homes as well as aerospace robots and medical robots have been made.

A representative example of the home robot is a robot cleaner, which is a type of household appliance that sucks and cleans dust or foreign materials around the robot while autonomously traveling in a predetermined area. Such a robot cleaner is generally equipped with a rechargeable battery and obstacle sensors for avoiding obstacles during traveling. Such structure allows the robot cleaner to perform cleaning while traveling by itself.

In recent years, researches have been actively carried out to utilize the robot cleaner in various fields such as health care, smart home, remote control, and the like, instead of merely performing cleaning by autonomously traveling in a cleaning area.

When the robot cleaner performs autonomous traveling in the cleaning area, the robot cleaner may encounter various obstacles present in the cleaning area. Therefore, in order to avoid the obstacles while performing the autonomous traveling and cleaning work, a device or method is required to detect information related to such obstacles.

Further, the robot cleaner may detect the information related to the obstacles and simultaneously acquire map information related to its cleaning area. The map information may include a feature map and a grid map, and a double grid map is widely used.

A general method of recognizing a location using a grid map is as follows. Positions at which a cleaner performing autonomous traveling can be located are estimated on the grid map and all range scan data that can be acquired at the estimated positions are simulated.

Then, a general cleaner detects (searches for) data most similar to range scan data, which has been actually collected by the autonomous mobile robot using a range scan sensor, among all the simulated range scan data, and recognizes an estimated position where the data has been generated as a current position of the autonomous mobile robot.

In this regard, Korean Patent Laid-Open Publication No. 10-2016-0038437 (published on Apr. 7, 2016) discloses a method of detecting a position of a cleaner by acquiring surrounding images and extracting feature distribution from those images.

However, according to this method, there is a problem that it is not considered how much information related to surrounding environments can be obtained at a specific position.

That is, when a travel path (driving path) of a cleaner is set in the related art manner, it is not determined whether or not information required for detecting a position is sufficiently provided for each grid of a cleaning area while traveling to a destination. Therefore, while the cleaner is traveling in the related art manner, the cleaner enters an area where information for recognizing the position of the cleaner is not sufficiently obtained, which causes a problem of losing the position of the cleaner or bringing about erroneous detection of the position.

DISCLOSURE

Technical Problem

One aspect of the present disclosure is to provide a cleaner performing autonomous traveling, capable of moving up to a destination while avoiding a partial area of a cleaning area when map information corresponding to the partial area is inaccurate, and a method of controlling the same.

Another aspect of the present disclosure is to provide a cleaner performing autonomous traveling, capable of acquiring accurate information related to a position of a main body as well as simply avoiding obstacles in the shortest path, and a method of controlling the same.

Still another aspect of the present disclosure is to provide a cleaner performing autonomous traveling, capable of avoiding entry into a dangerous area and moving up to a destination as safely as possible, and a method of controlling the same.

Technical Solution

In order to solve the technical problems of the present disclosure as described above, a cleaner according to the present disclosure may include a main body, a driving unit to move the main body, a sensing unit to acquire information related to a surrounding environment of the main body while the main body is traveling in a cleaning area, and a control unit to generate map information corresponding to the cleaning area based on the information acquired by the sensing unit, set a driving cost value (or driving cost value) for each of a plurality of grids included in the map information, and set a travel path of the main body based on the set driving cost values.

In one embodiment, the control unit may determine accuracy of the information related to the surrounding environment corresponding to each of the plurality of grids and calculate the driving cost value based on the accuracy determined for each of the plurality of grids.

In one embodiment, the sensing unit may be provided with a camera sensor, and the information related to the surrounding environment may include a surrounding image of the main body obtained by the camera sensor.

In one embodiment, the control unit may detect a plurality of features for the plurality of grids, respectively, from the image and determine accuracy for each of the plurality of grids based on the detected features.

In one embodiment, the control unit may grant a score for the feature detected for each of the plurality of grids according to a predetermined rule and determine the driving cost value assigned for each of the plurality of grids based on the assigned score.

In one embodiment, the control unit may determine the driving cost value assigned to each of the plurality of grids, based on at least one of brightness of the image, and a number of the features detected from the image, and distribution of the features.

In one embodiment, the control unit may control the driving unit so that the cleaner avoids one section of the cleaning area while moving to a destination.

In one embodiment, an amount of information related to the surrounding environment of the main body, acquired in the one section, may be smaller than an amount of preset reference information.

In one embodiment, the control unit may determine the amount of information related to the surrounding environment of the main body based on the number of features extracted from the image.

In one embodiment, the information related to the surrounding environment of the main body may include an image of a ceiling within the cleaning area.

Advantageous Effects

According to the present disclosure, a positional error of the cleaner, which is perceived by the cleaner performing autonomous traveling, can be reduced.

Also, according to the present disclosure, a dangerous area where the cleaner cannot sufficiently acquire information related to a surrounding environment can be avoided, which may result in improving travel stability of the cleaner.

In addition, according to the present disclosure, information collected when the cleaner generates map information can be used, thereby improving avoidance performance for obstacles even without an addition of a separate sensor.

MODES FOR CARRYING OUT THE PREFERRED EMBODIMENTS

Hereinafter, description will be given in detail of embodiments disclosed herein. Technical terms used in this specification are merely used for explaining specific embodiments, and should not be constructed to limit the scope of the technology disclosed herein.

Figure 1:
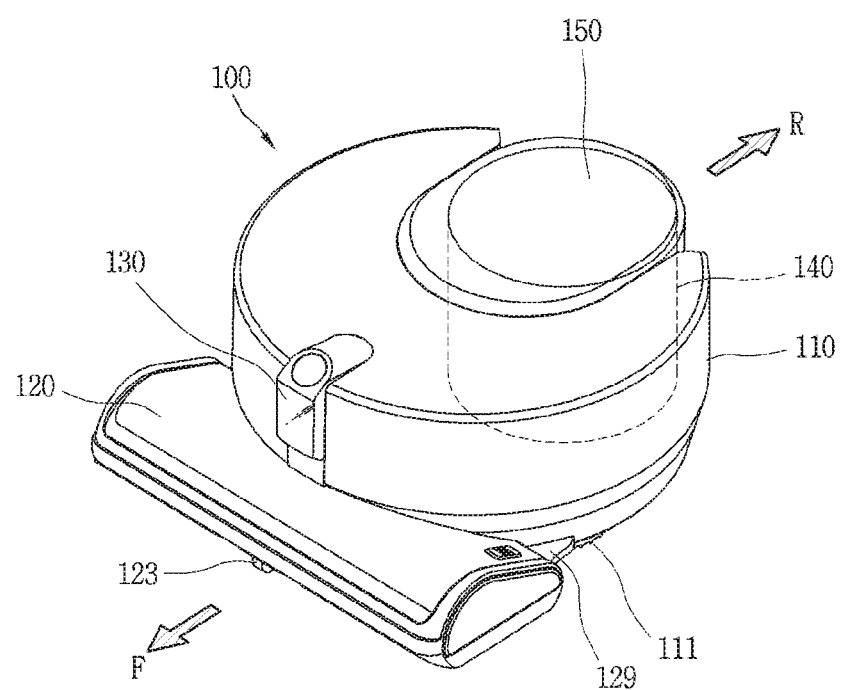
FIG. 1 is a perspective view illustrating one embodiment of a cleaner according to the present disclosure.
Figure 2:
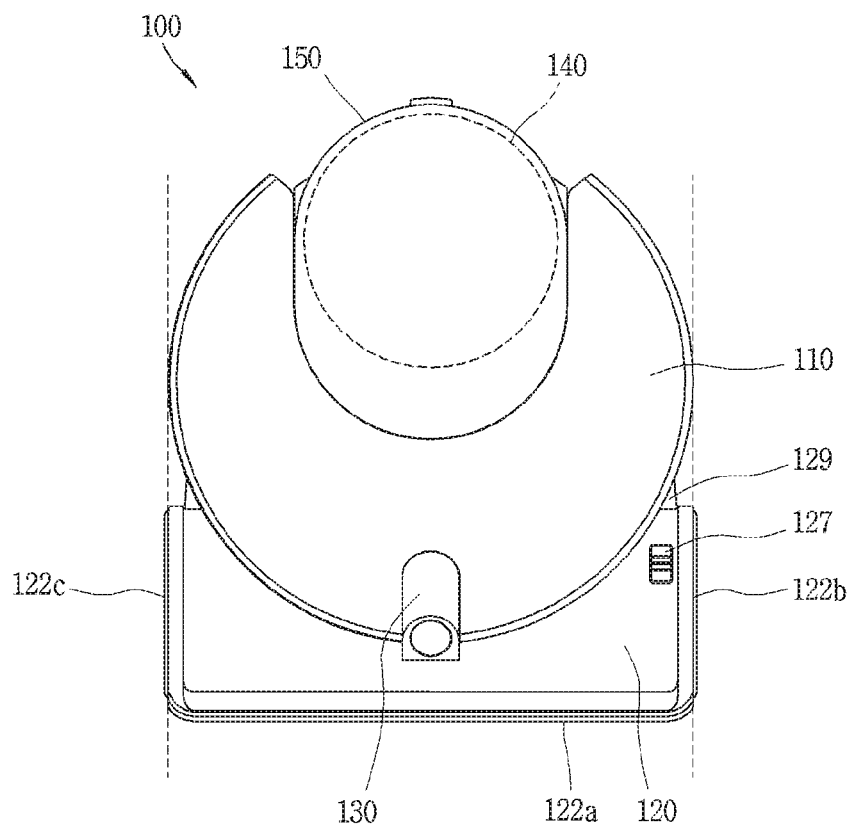
FIG. 2 is a planar view of the cleaner illustrated in FIG. 1.
Figure 3:
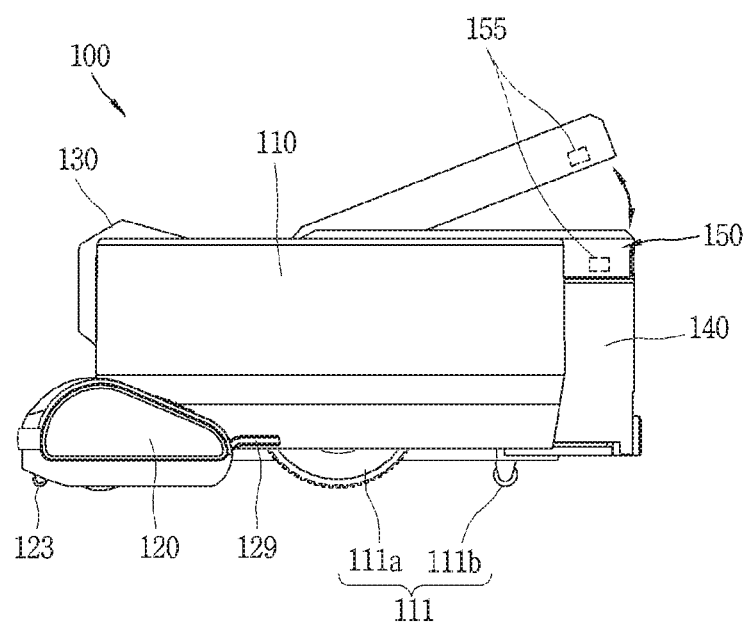
FIG. 3 is a lateral view of the cleaner illustrated in FIG. 1.

FIG. 1 is a perspective view illustrating one embodiment of a robot cleaner 100 according to the present disclosure, FIG. 2 is a front view of the robot cleaner 100 illustrated in FIG. 1, and FIG. 3 is a lateral view of the robot cleaner 100 illustrated in FIG. 1.

For reference, in this specification, a mobile robot, a robot cleaner, and a cleaner that performs autonomous traveling may be used in the same sense.

Referring to FIGS. 1 to 3, a robot cleaner 100 performs a function of cleaning a floor while traveling on a predetermined area by itself. Cleaning the floor disclosed herein includes sucking dust (including foreign materials) on the floor or mopping the floor.

The robot cleaner 100 may include a cleaner main body 110, a suction unit (or suction head) 120, a sensing unit 130, and a dust container 140.

The cleaner main body 110 is provided with a control unit or controller (not shown) for controlling the robot cleaner 100 and a wheel unit 111 for traveling the robot cleaner 100. The robot cleaner 100 may be moved or rotated forward, backward, left or right by the wheel unit 111.

The wheel unit 111 includes main wheels 111a and a sub wheel 111b.

The main wheels 111a are provided on both sides of the cleaner main body 110 and configured to be rotatable in one direction or another direction according to a control signal of the control unit. Each of the main wheels 111a may be configured to be driven independently of each other. For example, each main wheel 111a may be driven by a different motor.

The sub wheel 111b supports the cleaner main body 110 together with the main wheels 111a and assists the traveling of the robot cleaner 100 by the main wheels 111a. The sub wheel 111b may also be provided on a suction unit 120 to be described later.

The control unit controls the driving of the wheel unit 111, so that the robot cleaner 100 is allowed to autonomously travel on the floor.

Meanwhile, the cleaner main body 110 is provided with a battery (not shown) for supplying power to the robot cleaner 100. The battery 190 may be configured to be rechargeable, and may be detachably disposed in a bottom portion of the cleaner main body 110.

The suction unit 120 is disposed to protrude from one side of the cleaner main body 110 so as to suck air containing dust. The one side may be a side where the cleaner main body 110 travels in a forward direction F, that is, a front side of the cleaner main body 110.

In this drawing, the suction unit 120 is shown having a shape protruding from one side of the cleaner main body 110 to a front side and both left and right sides. Specifically, a front end portion of the suction unit 120 is disposed at a position spaced forward apart from the one side of the cleaner main body 110, and left and right end portions of the suction unit 120 are disposed at positions spaced apart from the one side of the cleaner main body 110 in the right and left directions.

As the cleaner main body 110 is formed in a circular shape and both sides of a rear end portion of the suction unit 120 protrude from the cleaner main body 110 to both left and right sides, empty spaces, namely, gaps may be formed between the cleaner main body 110 and the suction unit 120. The empty spaces are spaces between both left and right end portions of the cleaner main body 110 and both left and right end portions of the suction unit 120 and each has a shape recessed into the robot cleaner 100.

If an obstacle is caught in the empty space, the robot cleaner 100 may be likely to be unmovable due to the obstacle. To prevent this, a cover member 129 may be disposed to cover at least part of the empty space. The cover member 129 may be provided on the cleaner main body 110 or the suction unit 120. In this embodiment of the present disclosure, the cover member 129 protrudes from each of both sides of the rear end portion of the suction unit 120 and covers an outer circumferential surface of the cleaner main body 110.

The cover member 129 is disposed to fill at least part of the empty space, that is, the empty space between the cleaner main body 110 and the suction unit 120. This may result in realizing a structure capable of preventing an obstacle from being caught in the empty space, or to easily escape an obstacle even if the obstacle is caught in the empty space.

The cover member 129 protruding from the suction unit 120 may be supported on the outer circumferential surface of the cleaner main body 110. The cover member 129 may be supported on a rear portion of the suction unit 120 if the cover member 129 protrudes from the cleaner main body 110. According to this structure, when the suction unit 120 is impacted due to colliding with an obstacle, a part of the impact is transferred to the cleaner main body 110 so as to be dispersed.

The suction unit 120 may be detachably coupled to the cleaner main body 110. When the suction unit 120 is detached from the cleaner main body 110, a mop module (not shown) may be detachably coupled to the cleaner main body 110 in place of the detached suction unit 120. Accordingly, the user can mount the suction unit 120 on the cleaner main body 110 when the user wishes to remove dust on the floor, and may mount the mop module on the cleaner main body 110 when the user wants to mop the floor.

When the suction unit 120 is mounted on the cleaner main body 110, the mounting may be guided by the cover member 129 described above. That is, as the cover member 129 is disposed to cover the outer circumferential surface of the cleaner main body 110, a relative position of the suction unit 120 with respect to the cleaner main body 110 may be determined.

The cleaner main body 110 is provided with a sensing unit 130. As illustrated, the sensing unit 130 may be disposed on one side of the cleaner main body 110 where the suction unit 120 is located, that is, on a front side of the cleaner main body 110.

The sensing unit 130 may be disposed to overlap the suction unit 120 in an up and down direction of the cleaner main body 110. The sensing unit 130 is disposed at an upper portion of the suction unit 120 so as to detect an obstacle or feature in front of the robot so that the suction unit 120 positioned at the forefront of the robot cleaner 100 does not hit the obstacle.

The sensing unit 130 may be configured to additionally perform another sensing function other than the sensing function. This will be described in detail later.

The cleaner main body 110 is provided with a dust container accommodating portion. The dust container 140 in which dust separated from the sucked air is collected is detachably coupled to the dust container accommodating portion. As illustrated, the dust container accommodating portion may be formed in another side of the cleaner main body 110, namely, in the rear of the cleaner main body 110.

A part of the dust container 140 may be accommodated in the dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which dust-separated air is exhausted. When the dust container 140 is installed in the dust container accommodating portion, the inlet and the outlet are arranged to communicate with a first opening and a second opening, respectively, which are formed in an inner wall of the dust container accommodating portion.

An intake passage in the cleaner main body 110 corresponds to a flow path from an intake port (not shown) communicating with a communicating portion to the first opening, and an exhaust passage corresponds to a flow path from the second opening to an exhaust port.

According to such connection, air containing dust introduced through the suction unit 120 flows into the dust container 140 through the intake passage inside the cleaner main body 110 and the air and the dust are separated from each other while passing through a filter and cyclone of the dust container 140. The separated dust is collected in the dust container 140, and the air is discharged from the dust container 140 and flows along the exhaust passage inside the cleaner main body 110 so as to be externally exhausted through the exhaust port.

Hereinafter, an embodiment related to the components of the robot cleaner 100 will be described with reference to FIG. 4.

A robot cleaner 100 or a mobile robot according to an embodiment of the present disclosure may include at least one of a communication unit 1100, an input unit 1200, a driving unit 1300, a sensing unit (or sensor) 1400, an output unit 1500, a power supply unit 1600, a memory 1700, and a control unit (or controller) 1800, or a combination thereof.

Figure 4:
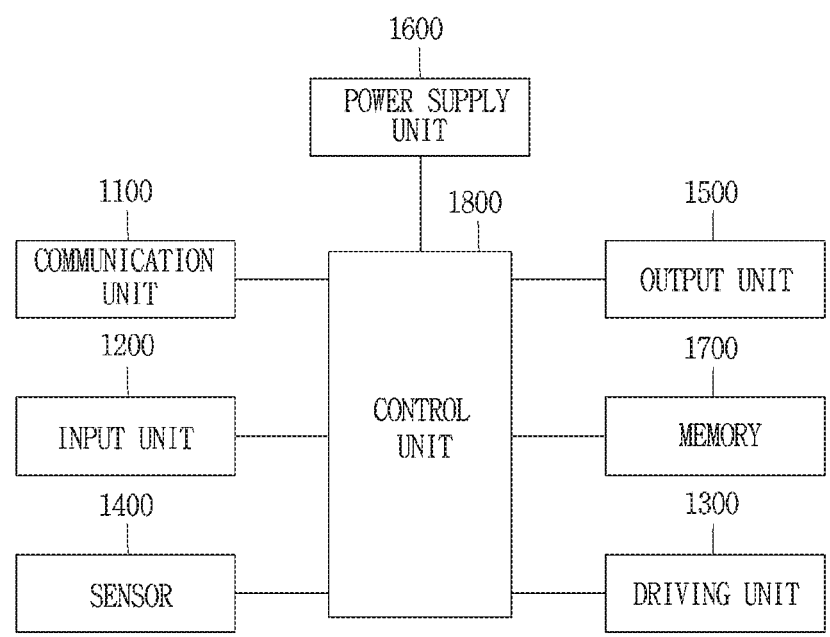
FIG. 4 is a block diagram illustrating components of a cleaner according to one embodiment of the present disclosure.

At this time, those components shown in FIG. 4 are not essential, and a robot cleaner having greater or fewer components can be implemented. Hereinafter, each component will be described.

First, the power supply unit 1600 includes a battery that can be charged by an external commercial power supply, and supplies power to the mobile robot. The power supply unit 1600 supplies driving force to each of the components included in the mobile robot to supply operating power required for the mobile robot to travel or perform a specific function.

At this time, the control unit 1800 may detect a remaining amount of power (or remaining power level or battery level) of the battery. The control unit 1800 may control the mobile robot to move to a charging base connected to the external commercial power supply when the remaining power is insufficient, so that the battery can be charged by receiving charging current from the charging base. The battery may be connected to a battery sensing portion so that a remaining power level and a charging state can be transmitted to the control unit 1800. The output unit 1500 may display the remaining battery level on a screen under the control of the control unit.

The battery may be located in a bottom portion of a center of the robot cleaner, or may be located in either the left or right side. In the latter case, the mobile robot may further include a balance weight to eliminate weight bias of the battery.

On the other hand, the driving unit 1300 may include a motor, and operate the motor to bidirectionally rotate left and right main wheels, so that the main body can rotate or move. The driving unit 1300 may advance the main body of the mobile robot forward, backward, left, right, curvedly, or in place.

On the other hand, the input unit 1200 receives various control commands for the robot cleaner from the user. The input unit 1200 may include one or more buttons, for example, the input unit 1200 may include an OK button, a setting button, and the like. The OK button is a button for receiving a command for confirming detection information, obstacle information, position information, and map information from the user, and the setting button is a button for receiving a command for setting the information from the user.

In addition, the input unit 1200 may include an input reset button for canceling a previous user input and receiving a new user input, a delete button for deleting a preset user input, a button for setting or changing an operation mode, a button for receiving an input to return to the charging base.

In addition, the input unit 1200 may be implemented as a hard key, a soft key, a touch pad, or the like and may be disposed on a top of the mobile robot. For example, the input unit 1200 may implement a form of a touch screen together with the output unit 1500.

On the other hand, the output unit 1500 may be installed on a top of the mobile robot. Of course, an installation location and an installation type may vary. For example, the output unit 1500 may display a battery level state, a traveling mode or manner, or the like on a screen.

The output unit 1500 may output internal status information of the mobile robot detected by the sensing unit 1400, for example, a current status of each component included in the mobile robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the mobile robot executed by the control unit 1800 or an operation result. For example, the output unit 1500 may output warning sound to the outside in response to a warning signal generated by the control unit 1800.

In this case, the audio output module may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to one embodiment of the present disclosure can output environmental information related to a travel area through the output unit 1500 or output the same in an audible manner. According to another embodiment, the mobile robot may transmit map information or environmental information to a terminal device through the communication unit 1100 so that the terminal device outputs a screen to be output through the output unit 1500 or sounds.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another device located in a specific area. In this case, the another device may be any device if it can transmit and receive data through a network. For example, the another device may be an air conditioner, a heating device, an air purifier, a lamp, a TV, a vehicle, and the like. The another device may also be a device for controlling a door, a window, a water supply valve, a gas valve, or the like. The another device may also be a sensor for detecting temperature, humidity, air pressure, gas, or the like.

The memory 1700 stores a control program for controlling or driving the robot cleaner and data corresponding thereto. The memory 1700 may store audio information, image information, obstacle information, position information, map information, and the like. Also, the memory 1700 may store information related to a traveling pattern.

The memory 1700 mainly uses a nonvolatile memory. Here, the nonvolatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

On the other hand, the sensing unit 1400 may include at least one of an external signal sensor, a front sensor, a cliff sensor, a lower camera sensor, and an upper camera sensor.

The external signal sensor or external signal detection sensor may sense an external signal of a mobile robot. The external signal sensor may be, for example, an infrared ray (IR) sensor, an ultrasonic sensor, a radio frequency (RF) sensor, or the like.

The mobile robot may detect a position and direction of the charging base by receiving a guidance signal generated by the charging base using the external signal sensor. At this time, the charging base may transmit a guidance signal indicating a direction and distance so that the mobile robot can return thereto. That is, the mobile robot may determine a current position and set a moving direction by receiving a signal transmitted from the charging base, thereby returning to the charging base.

On the other hand, the front sensors or front detection sensors may be installed at a predetermined distance on the front of the mobile robot, specifically, along a circumferential surface of a side surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the control unit 1800. That is, the front sensor may detect protrusions on the moving path of the mobile robot, household appliances, furniture, walls, wall corners, and the like, and transmit the information to the control unit 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

An ultrasonic sensor, for example, may generally be used to detect a remote obstacle. The ultrasonic sensor may be provided with a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using an ultrasonic wave radiation time and an ultrasonic wave reception time.

Also, the control unit 1800 may detect information related to a size of an obstacle by comparing ultrasonic waves radiated from the transmitter with ultrasonic waves received by the receiver. For example, the control unit 1800 may determine that the obstacle is larger in size when more ultrasonic waves are received in the receiver.

In one embodiment, a plurality (e.g., five) of ultrasonic sensors may be installed on side surfaces of the mobile robot at the front side along an outer circumferential surface. At this time, the ultrasonic sensors may preferably be installed on the front surface of the mobile robot in a manner that the transmitter and the receiver are alternately arranged.

That is, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Also, receiving sensitivity of the receivers may be set differently.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the mobile robot together with the ultrasonic sensor. The IR sensor may also detect an obstacle existing on a front or side of the mobile robot and transmit obstacle information to the control unit 1800. That is, the IR sensor senses a protrusion, a household fixture, furniture, a wall, a wall edge, and the like, existing on the moving path of the mobile robot, and transmits detection information to the control unit 1800. Therefore, the mobile robot can move within a specific area without collision with an obstacle.

On the other hand, a cliff sensor (or cliff detection sensor) may detect an obstacle on the floor supporting the main body of the mobile robot by mainly using various types of optical sensors.

That is, the cliff sensor may also be installed on a rear surface of the mobile robot on the floor, but may be installed on a different position depending on a type of the mobile robot. The cliff sensor is located on the rear surface of the mobile robot and detects an obstacle on the floor. The cliff sensor may be an IR sensor, an ultrasonic sensor, an RF sensor, a Position Sensitive Detector (PSD) sensor, and the like, which include a transmitter and a receiver, similar to the obstacle detection sensor.

For example, one of the cliff sensors may be installed on the front of the mobile robot, and two other cliff sensors may be installed relatively behind.

For example, the cliff sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. As a type of infrared sensor, the PSD sensor uses infrared rays. The PSD sensor emits infrared ray, and measures a distance by calculating an angle of the infrared ray reflected and returned from an obstacle. That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the control unit 1800 may determine whether to pass a cliff or not according to a ground state of the detected cliff by using the cliff detection sensor, and decide whether to pass the cliff or not according to the determination result. For example, the control unit 1800 determines presence or non-presence of a cliff and a depth of the cliff through the cliff sensor, and then allows the mobile robot to pass through the cliff only when a reflection signal is detected through the cliff sensor.

As another example, the control unit 1800 may also determine lifting of the mobile robot using the cliff sensor.

On the other hand, the lower camera sensor is provided on the rear surface of the mobile robot, and acquires image information regarding the lower side, that is, the bottom surface (or the surface to be cleaned) during the movement. The lower camera sensor is also referred to as an optical flow sensor in other words. The lower camera sensor converts a lower image input from an image sensor provided in the sensor to generate image data of a predetermined format. The generated image data may be stored in the memory 1700.

Also, at least one light source may be installed adjacent to the image sensor. The at least one light source emits light to a predetermined area of the floor, which is captured by the image sensor. That is, while the mobile robot moves in a specific area along the floor surface, a certain distance is maintained between the image sensor and the floor surface when the floor surface is flat. On the other hand, when the mobile robot moves on a floor surface which is not flat, the image sensor and the floor surface are spaced apart from each other by a predetermined distance due to an unevenness and an obstacle on the floor surface. At this time, the at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the mobile robot irrespective of slippage of the mobile robot, using the lower camera sensor. The control unit 1800 may compare and analyze image data captured by the lower camera sensor according to time to calculate a moving distance and a moving direction, and calculate a position of the mobile robot based on the calculated moving distance and moving direction. By using the image information regarding the lower side of the mobile robot captured by the lower camera sensor, the control unit 1800 may perform correction that is robust against slippage with respect to the position of the mobile robot calculated by another element.

On the other hand, the upper camera sensor may be installed to face a top or front of the mobile robot so as to capture the vicinity of the mobile robot. When the mobile robot includes a plurality of upper camera sensors, the camera sensors may be disposed on the upper or side surface of the mobile robot at predetermined distances or at predetermined angles.

Hereinafter, description will be given of a method in which a typical mobile robot, a robot cleaner, or an autonomously moving cleaner moves within a cleaning area, with reference to FIG. 5.

Figure 5:
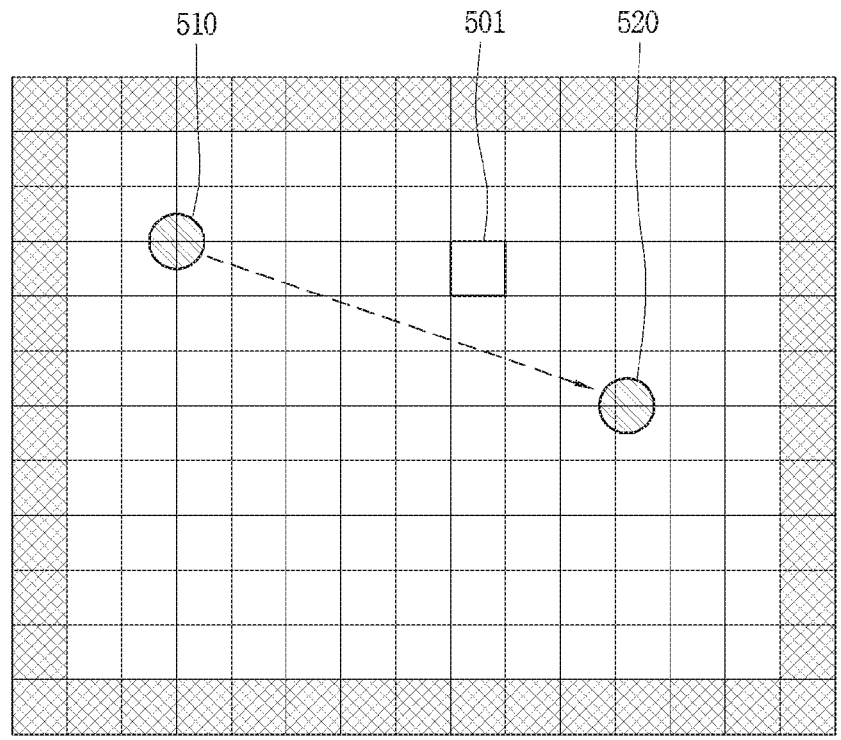
FIG. 5 is a conceptual view illustrating one embodiment of a cleaner that travels only using map information.

As illustrated in FIG. 5, a memory of a robot cleaner may store map information related to a cleaning area.

The control unit of the robot cleaner may generate map information using information sensed by sensors while the robot cleaner performs a cleaning operation or a traveling operation in a cleaning area, and may store the generated map information in the memory.

Referring to FIG. 5, the map information may be formed of a plurality of grids 501. That is, the control unit may set information related to at least one of an area feature, obstacles, brightness, and a floor material for each unit area corresponding to the grid 501. In addition, the control unit may set coordinate information for each grid 501.

The control unit of the related art robot cleaner controls the driving unit to move the main body of the cleaner to a destination using only the set coordinate information. That is, a travel path of the cleaner is set to the shortest path from a current position 510 of the main body to a destination 520.

However, when the path or route of the cleaner is set by this method, the cleaner may be likely to enter a dangerous area and cannot move any more. Here, the dangerous area may mean an area where the cleaner is difficult to travel normally, or may mean an area where the sensor is difficult to acquire sufficient information related to an environment around the cleaner.

That is, according to the traveling method illustrated in FIG. 5, since the control unit sets a route that can minimize only costs required for movement, without considering the entry into the dangerous area where the location of the cleaner cannot be recognized, there is high probability that the cleaner loses its position during the movement.

On the other hand, one embodiment of a cleaner that travels using a Voronoi diagram will be described with reference to FIG. 6.

Figure 6:
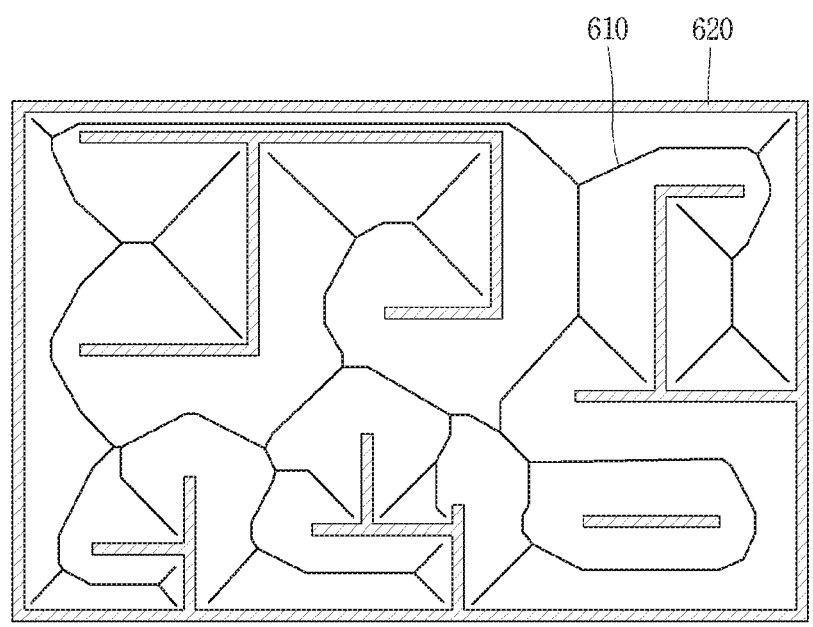
FIG. 6 is a conceptual view illustrating one embodiment of a cleaner that travels using a Voronoi diagram.

Referring to FIG. 6, the control unit using the Voronoi diagram generates a plurality of polygons 610 on a map based on information regarding obstacles 620, and generates a movement path based on the generated polygons.

That is, according to the traveling method illustrated in FIG. 6, the control unit 1800 selects one of the plurality of obstacles 620 on a plane corresponding to the cleaning area, generates a perpendicular bisector based on the selected obstacle, and generates a plurality of polygons by the generated bisector.

However, the travel path setting method using the Voronoi diagram only uses such obstacle information of the map, and has a problem that a dangerous area on the travel path cannot be determined.

Therefore, a cleaner according to the present invention and a method of controlling the same will be described hereinafter, with reference to FIGS. 7 and 8.

Figure 7:
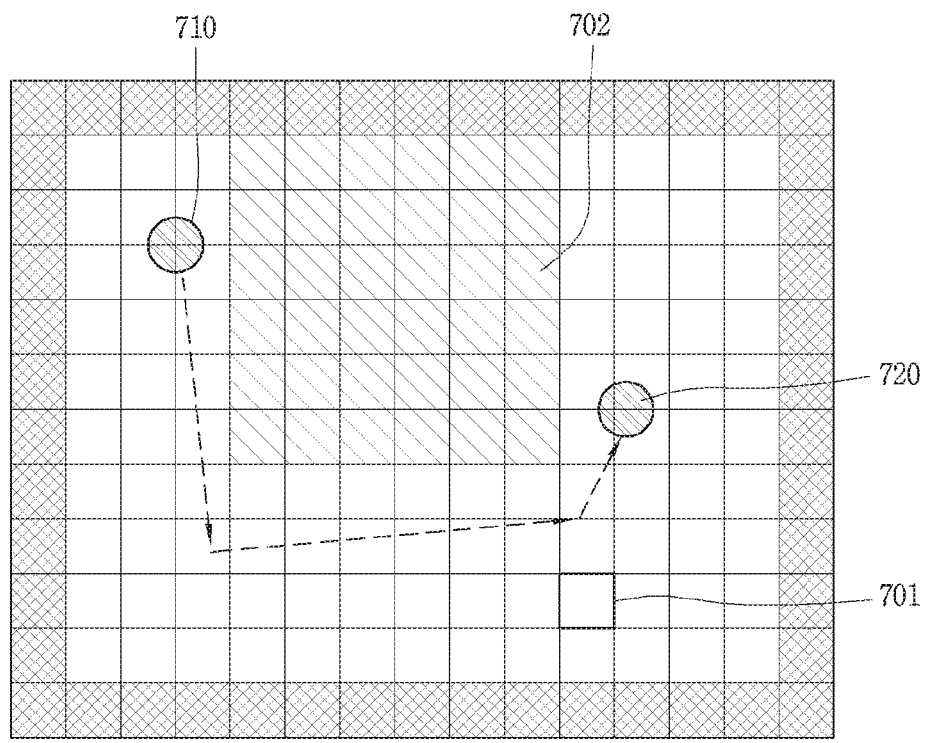
FIG. 7 is a conceptual view illustrating a traveling method of a cleaner according to the present disclosure.
Figure 8:
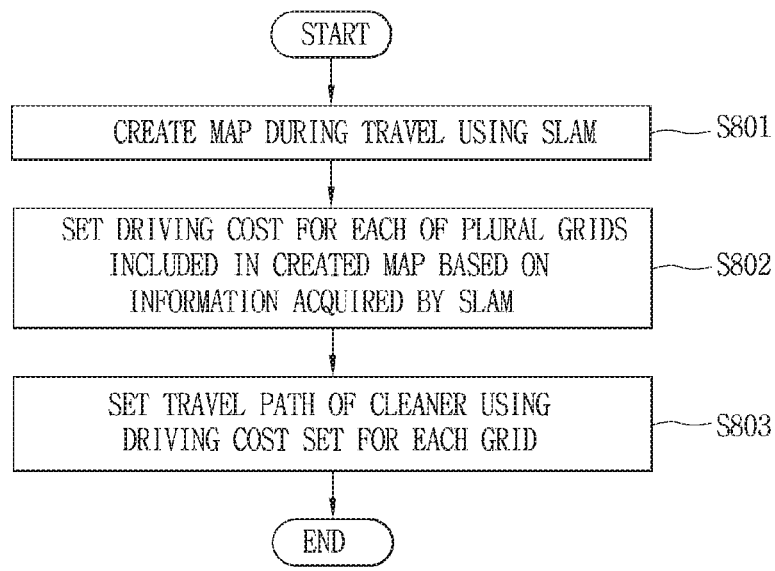
FIG. 8 is a flowchart illustrating a method of controlling a cleaner according to the present disclosure.

Referring to FIG. 7, a controller 1800 of a mobile robot or a robot cleaner 100 which performs autonomous traveling may generate map information corresponding to a cleaning area based on information obtained by a sensor 1400, and set a driving cost value (or driving cost value) for each of a plurality of grids (or areas) 701 included in the map information. In addition, the control unit 1800 may set a travel path of the main body on the basis of the set driving cost value.

At this time, the sensor 1400 may acquire information related to a surrounding environment of the main body of the cleaner 100 while the main body of the cleaner 100 is traveling in the cleaning area.

Specifically, the control unit 1800 may determine accuracy of the information related to the surrounding environment corresponding to each of the plurality of grids 701. The control unit 1800 may calculate a driving cost value to be set for each grid 701, based on the accuracy determined for each of the plurality of grids 701.

In one embodiment, the control unit 1800 may grant a score for a feature detected for each of the plurality of grids according to a predetermined rule, and determine a driving cost value assigned for each of the plurality of grids based on the granted score.

In one example, the information related to the surrounding environment of the main body may be an image around the main body obtained by a camera sensor.

In more detail, the control unit 1800 may determine a driving cost value assigned to each of the plurality of grids, based on at least one of brightness of the image, the number of features detected from the image, and distribution of the features.

As illustrated in FIG. 7, the control unit 1800 may control the driving unit to avoid one section of the cleaning area while the cleaner 100 moves to a destination.

Here, an amount of information related to the surrounding environment of the main body obtained in the one section is smaller than an amount of preset reference information.

In one example, the control unit 1800 may determine the amount of information related to the surrounding environment of the main body based on the number of features extracted from the image.

Specifically, the control unit 1800 of the cleaner 100 according to the present disclosure may control the driving unit to avoid a dangerous area 702 while moving from a current position 710 to the destination 720.

For example, the dangerous area 702 may include an area under the furniture where a ceiling image cannot be obtained. In another example, the dangerous area 702 may include a dark place where light necessary to acquire an image is not sufficiently supplied.

That is, according to the traveling method of the present disclosure, when the dangerous area 702 exists on the shortest path for moving from the current position 710 to the destination 720 of the cleaner 100, the control unit may set a travel path of the vehicle 100 so as not to pass through the dangerous area 702.

On the other hand, although not illustrated in FIG. 7, the control unit 1800 of the present disclosure sets the travel path of the cleaner 100 based on the driving cost set for each grid 701 of the map information, and thus it does not mean that the cleaner 100 avoids the dangerous area 702 unconditionally.

That is, when a driving cost of a first travel path passing through a part of the dangerous area 702 is lower than a driving cost of a second travel path completely avoiding the dangerous area 702, the control unit 1800 may also select the first travel path.

The control unit 1800 may set the travel path according to a residual capacity of the battery, so that the driving cost set for each of the plurality of grids 702 corresponding to the travel path belongs to a specific driving cost range.

That is, when the residual capacity of the battery is equal to or greater than a margin capacity, the control unit 1800 may control the driving unit so that the driving cost set for each of the plurality of grids corresponding to the travel path can be included in the specific driving cost range (i.e., the cleaner 100 can pass through only grids, for which the driving cost values each included in the specific driving cost range have been set).

On the other hand, when the residual capacity of the battery is smaller than the margin capacity, the control unit 1800 may set the travel path so that the cleaner 100 moves along the shortest path, regardless of the driving costs set for the grids.

Hereinafter, a method for controlling a cleaner 100 according to the present disclosure will be described with reference to FIG. 8.

The control unit 1800 of the present disclosure may determine position accuracy for each grid of a cleaning area by using data that was acquired in the existing Simultaneous Localization And Mapping (SLAM) system but was not utilized when generating map information.

That is, the control unit 1800 may create a map using SLAM during its travel (S801).

The control unit 1800 may set a driving cost for each of a plurality of grids included in the created map, based on information obtained by the SLAM (S802).

For example, the information obtained by the SLAM may include a ceiling image.

The control unit 1800 may set a travel path of the cleaner 100 using the driving cost set for each grid (S803).

According to the present disclosure, a positional error of the cleaner, which is perceived by the cleaner performing autonomous traveling, can be reduced.

Also, according to the present disclosure, a dangerous area where the cleaner cannot sufficiently acquire information related to a surrounding environment can be avoided, which may result in improving travel stability of the cleaner.

In addition, according to the present disclosure, information collected when the cleaner generates map information can be used, thereby improving avoidance performance for obstacles even without an addition of a separate sensor.

The invention claimed is:

1. A robot comprising:
    a main body;
    a motor that rotates left and right main wheels to move the main body in a region;
    a sensor to acquire information related to a surrounding environment of the main body while the main body is moving in the region; and
    a controller to:
        generate map information corresponding to the region based on the information acquired by the sensor,
        set driving cost values for a plurality of areas included in the region, and
        set a driving path of the main body through the areas based on the set driving cost values and so that the robot avoids one section of the region while moving to a destination,
    wherein the sensor includes a camera to obtain an image of the surrounding environment of the main body, and
    wherein the controller is further configured to:
        detect a plurality of features for the plurality of areas, respectively, from the image,
        set the driving cost value for each of a plurality of areas based on at least one of a brightness of at least a portion of the image, a number of the features detected from the image, or a distribution of the features, and
        set, as the driving path, a shortest path for moving from a current position of the main body to the destination based on the set driving cost values.

2. The robot of claim 1, wherein the controller further determines accuracies of the information related to the surrounding environment for the plurality of areas, and the driving cost values based on the accuracies determined for the plurality of areas.

3. The robot of claim 1, wherein the sensor includes a camera, and the information related to the surrounding environment includes an image of the surrounding environment obtained by the camera.

4. The robot of claim 3, wherein the controller further detects features for the areas from the image, determines sensing accuracies for the plurality of areas based on the detected features, and determines the driving cost values based on the sensing accuracies for the plurality of areas.

5. The robot of claim 4, wherein the controller determines scores for the features detected for the plurality of areas according to a rule, and determines the driving cost values for the plurality of areas based on the scores.

6. The robot of claim 4, wherein an amount of information related to the surrounding environment of the main body, acquired in the one section, is smaller than an amount of preset reference information.

7. The robot of claim 6, wherein the controller determines the amount of information related to the one section based on the number of features associated with the one section that are extracted from the image.

8. The robot of claim 1, wherein the sensor includes a camera, and wherein the information related to the surrounding environment of the main body includes an image of a ceiling associated with the surrounding environment.

9. The robot of claim 8, wherein the controller sets the driving path of the main body through the areas based on the set values such that the main body does not move into one of the areas under furniture where the image of the ceiling cannot be obtained or where there is insufficient light to acquire the image.

10. The robot of claim 1, wherein the controller further determines a residual battery capacity level and sets the driving path further based on the residual battery capacity level.

11. The robot of claim 1, wherein the controller determines when an amount of information related to the surrounding environment of the main body, acquired in the one section, is smaller than an amount of preset reference information.

12. The robot of claim 11, wherein the controller determines the amount of information related to the one section based on the quantity of features associated with the one section that are extracted from the image.

13. The robot of claim 1, wherein the controller further sets the driving path of the main body to avoid one or more obstacles.

14. The robot of claim 1, wherein the areas are positioned in a grid.

15. The robot of claim 1, further comprising a suction head, wherein the region through which the main body is moving is a cleaning area.

* * * * *